(12) United States Patent
Mouch et al.

(10) Patent No.: US 7,347,491 B2
(45) Date of Patent: Mar. 25, 2008

(54) RAIL TO ROCKER JOINT USING HYDROFORMED MEMBERS

(75) Inventors: Tim Mouch, Troy, MI (US); Musa Azzouz, Northville, MI (US); Michael Azzouz, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 179 days.

(21) Appl. No.: 11/354,047

(22) Filed: Feb. 14, 2006

(65) Prior Publication Data
US 2007/0187995 A1   Aug. 16, 2007

(51) Int. Cl.
   *B62D 25/20* (2006.01)
   *B62D 27/02* (2006.01)
(52) U.S. Cl. .................. 296/209; 296/30; 296/193.06; 296/203.02
(58) Field of Classification Search .................. 296/29, 296/30, 193.06, 203.01, 203.02, 204, 205, 296/209, 187.03, 187.09, 193.01
See application file for complete search history.

(56) References Cited

U.S. PATENT DOCUMENTS

| | | | | |
|---|---|---|---|---|
| 2,226,790 | A * | 12/1940 | Valletta | 296/204 |
| 4,469,368 | A * | 9/1984 | Eger | 296/203.02 |
| 4,545,612 | A * | 10/1985 | Harasaki | 296/203.02 |
| 4,550,948 | A * | 11/1985 | Hamada et al. | 296/202 |
| 4,557,519 | A * | 12/1985 | Matsuura | 296/204 |
| 4,669,776 | A * | 6/1987 | Harasaki | 296/203.02 |
| 4,679,820 | A * | 7/1987 | Srock et al. | 280/781 |
| 4,804,222 | A * | 2/1989 | Sakiyama et al. | 296/203.02 |
| 4,986,597 | A * | 1/1991 | Clausen | 296/205 |
| 5,002,333 | A * | 3/1991 | Kenmochi et al. | 296/204 |
| 5,042,872 | A * | 8/1991 | Yoshii | 296/203.02 |
| 5,085,484 | A * | 2/1992 | Mori | 296/204 |
| 5,110,177 | A * | 5/1992 | Akio | 296/187.11 |
| 5,201,566 | A * | 4/1993 | Mori | 296/192 |
| 5,332,281 | A * | 7/1994 | Janotik et al. | 296/209 |
| 5,476,303 | A * | 12/1995 | Sakamoto et al. | 296/204 |
| 5,634,663 | A * | 6/1997 | Krupp et al. | 280/800 |
| 5,806,918 | A * | 9/1998 | Kanazawa | 296/204 |

(Continued)

FOREIGN PATENT DOCUMENTS

GB    2153751 A  *  8/1985

(Continued)

*Primary Examiner*—D. Glenn Dayoan
*Assistant Examiner*—Paul A Chenevert
(74) *Attorney, Agent, or Firm*—Fredrick Owens; Miller Law Group, PLLC

(57) ABSTRACT

A process for connecting a hydroformed front rail member of an automotive frame to the body side inner (rocker) beam does not require a substantive re-design of the frame to accommodate an overlapping parallel orientation of two tubular frame members. The hydroformed front rail member is laser cut at the rearward end thereof to remove a portion of a side wall of the tubular member to form a C-shaped section. The front rail member is formed with a vertical dimension that provides a nesting relationship between the C-shaped section of the front rail member and the body side inner member so that the rocker beam can be received into the C-shaped section. Welding between the two members can be accomplished using either MIG-welding or spot-welding processes. A body side reinforcement can be added to provide a stiff frame joint as the reinforcement is swept off the rail structure to provide a box section.

16 Claims, 5 Drawing Sheets

U.S. PATENT DOCUMENTS

| | | | |
|---|---|---|---|
| 6,000,719 A * | 12/1999 | Kocer et al. | 280/781 |
| 6,053,564 A * | 4/2000 | Kamata et al. | 296/187.09 |
| 6,099,194 A * | 8/2000 | Durand | 403/270 |
| 6,209,948 B1 * | 4/2001 | Mori et al. | 296/187.09 |
| 6,631,942 B1 * | 10/2003 | Kitagawa | 296/187.1 |
| 6,824,204 B2 * | 11/2004 | Gabbianelli et al. | 296/205 |
| 6,908,146 B2 * | 6/2005 | Tomita | 296/203.02 |
| 7,140,674 B2 * | 11/2006 | Miyoshi et al. | 296/203.03 |
| 7,267,394 B1 * | 9/2007 | Mouch et al. | 296/203.02 |
| 2002/0074830 A1 * | 6/2002 | Takemoto | 296/203.02 |
| 2002/0163226 A1 * | 11/2002 | Shibata | 296/203.02 |
| 2003/0189358 A1 * | 10/2003 | Watanabe et al. | 296/203.02 |
| 2004/0140694 A1 * | 7/2004 | Miyabayashi | 296/203.02 |
| 2005/0046239 A1 * | 3/2005 | Nakamura et al. | 296/204 |
| 2005/0082876 A1 * | 4/2005 | Akasaka | 296/203.01 |
| 2005/0264042 A1 * | 12/2005 | Abe et al. | 296/203.01 |
| 2005/0269838 A1 * | 12/2005 | Sohmshetty et al. | 296/203.02 |

FOREIGN PATENT DOCUMENTS

| | | | | |
|---|---|---|---|---|
| JP | 54053417 | A | * | 4/1979 |
| JP | 61064587 | A | * | 4/1986 |
| JP | 63263175 | A | * | 10/1988 |
| JP | 02041981 | A | * | 2/1990 |
| JP | 02212280 | A | * | 8/1990 |
| JP | 02241881 | A | * | 9/1990 |
| JP | 02299989 | A | * | 12/1990 |
| JP | 04011580 | A | * | 1/1992 |
| JP | 04129882 | A | * | 4/1992 |
| JP | 04215570 | A | * | 8/1992 |
| JP | 06166383 | A | * | 6/1994 |
| JP | 06247343 | A | * | 9/1994 |

* cited by examiner

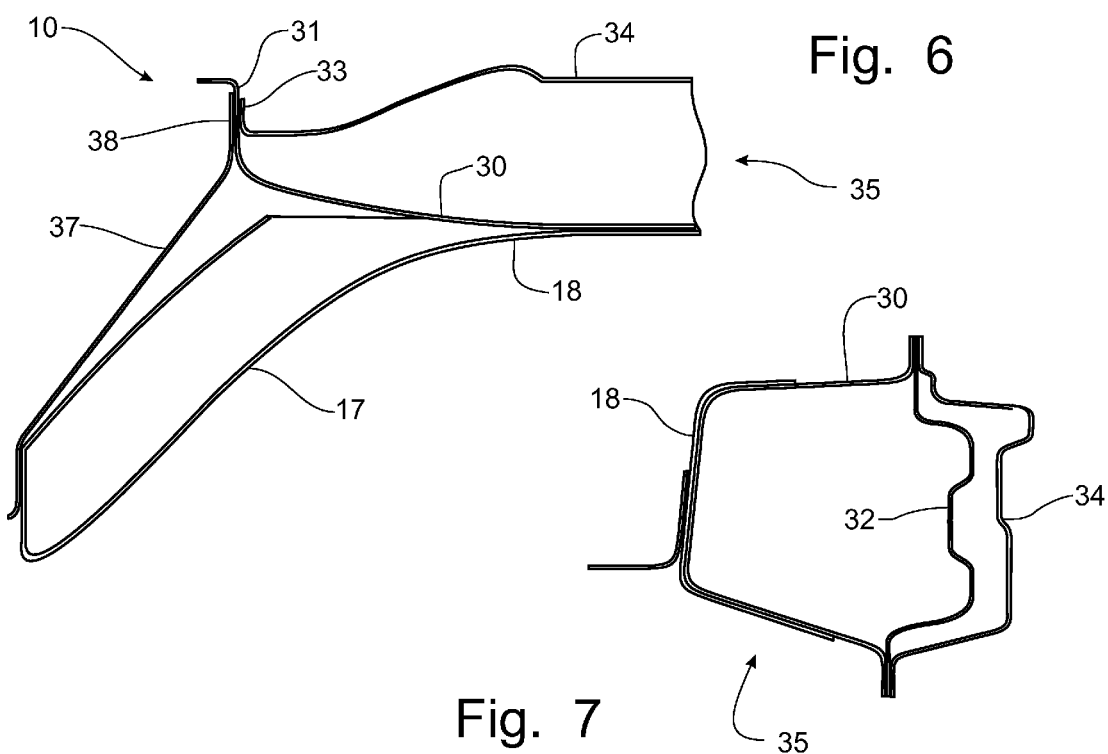

RAIL TO ROCKER JOINT USING HYDROFORMED MEMBERS

BACKGROUND OF THE INVENTION

Manufacturing processes for automobiles have evolved from one that utilized MIG welding processes, i.e. a welding process in which a line of molten material is deposited by the welder in joining two pieces of metal together. Spot-welding, a process involving the passage of electrical current between two electrodes to melt and join two pieces of metal placed between the electrodes, is being utilized in a greater degree in the manufacturing of automotive vehicles. Spot-welding requires a frame design that is conducive to being manufactured using the spot-welding process. For example, if two tubular members are being spot-welded, access to the adjoining walls of the two tubular members by the spot-welder electrodes must be provided.

The joining of hydroformed frame members presents a problem for frame construction in automobiles. If the frame members are positioned in a parallel orientation in an overlapping arrangement, the contiguous sides of the two frame members can be spot-welded together with the electrodes being inserted through openings formed during the hydroforming process in the respective opposing sides of the frame members. This overlapping of hydroformed frame members requires spatial consideration for accommodating large tubular frame members in a side-by-side relationship.

Tubular front rail sections have proven to provide cost and weight advantages over traditional stamped and welded front end structures. The challenge associated with the use of hydroformed tubular members is the joining of those tubular members to the rest of the body structure while maintaining current manufacturing processes and minimizing design changes and investment costs to form the automotive frame. It is also desirable to provide a frame design that will enhance the stiffness of the welded frame structure by providing a stiffer joint between joined frame members.

Accordingly, it would be desirable to provide an automotive frame that incorporates a hydroformed front rail member that can be joined to the existing body inner side (rocker) beam without requiring substantive re-design of the frame structure.

SUMMARY OF THE INVENTION

It is an object of this invention to overcome the aforementioned disadvantages of the known prior art by providing a process for welding a tubular, hydroformed front rail member to the body inner side beam.

It is another object of this invention to provide a structural member that will facilitate the spot-welding of hydroformed frame members.

It is still another object of this invention to form the tubular front rail member with a C-shaped section that will nest against the body inner side beam It is an advantage of this invention that the joint between the front rail member and the body inner side member (rocker) can be welded using either a MIG welding process or a spot welding process.

It is another advantage of this invention that the cost of manufacturing automotive frames can be reduced.

It is another feature of this invention that a body side reinforcement member can be welded to the front rail to rocker joint to improve stiffness of the joint.

It is still another feature of this invention that the rearward end of the front rail member is laser cut to remove a portion of the tubular side wall to create a C-shaped section that has sufficient size to nest against and receive the body inner side beam to facilitate the welding of the two members.

It is still another advantage of this invention that the rigidity of a hydroformed automotive frame is improved.

It is a further object of this invention to provide structure and a process for forming an automotive frame utilizing a hydroformed front rail structure that can be joined to the existing rocker beam structure that is durable in construction, inexpensive of manufacture, carefree of maintenance, facile in assemblage, and simple and effective in use.

These and other objects, features and advantages are accomplished according to the instant invention by providing a process for connecting a hydroformed front rail member of an automotive frame to the body side inner (rocker) beam without requiring a substantive re-design of the frame to accommodate an overlapping parallel orientation of two tubular frame members. The hydroformed front rail member is laser cut at the rearward end thereof to remove a portion of a side wall of the tubular member to form a C-shaped section. The front rail member is formed with a vertical dimension that provides a nesting relationship between the C-shaped section of the front rail member and the body side inner member so that the rocker beam can be received into the C-shaped section. Welding between the two members can be accomplished using either MIG welding or spot-welding processes. A body side reinforcement can be added to provide a stiff frame joint as the reinforcement is swept off the rail structure to provide a box section.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is an enlarged cross-sectional view of the rail to rocker joint taken along lines 6-6 of FIG. 5; and FIG. 7 is an enlarged cross-sectional view of the rail to rocker joint taken along lines 7-7 of FIG. 5.

DETAILED DESCRIPTION OF THE PREFERRED EMBODIMENT

Figure 1:
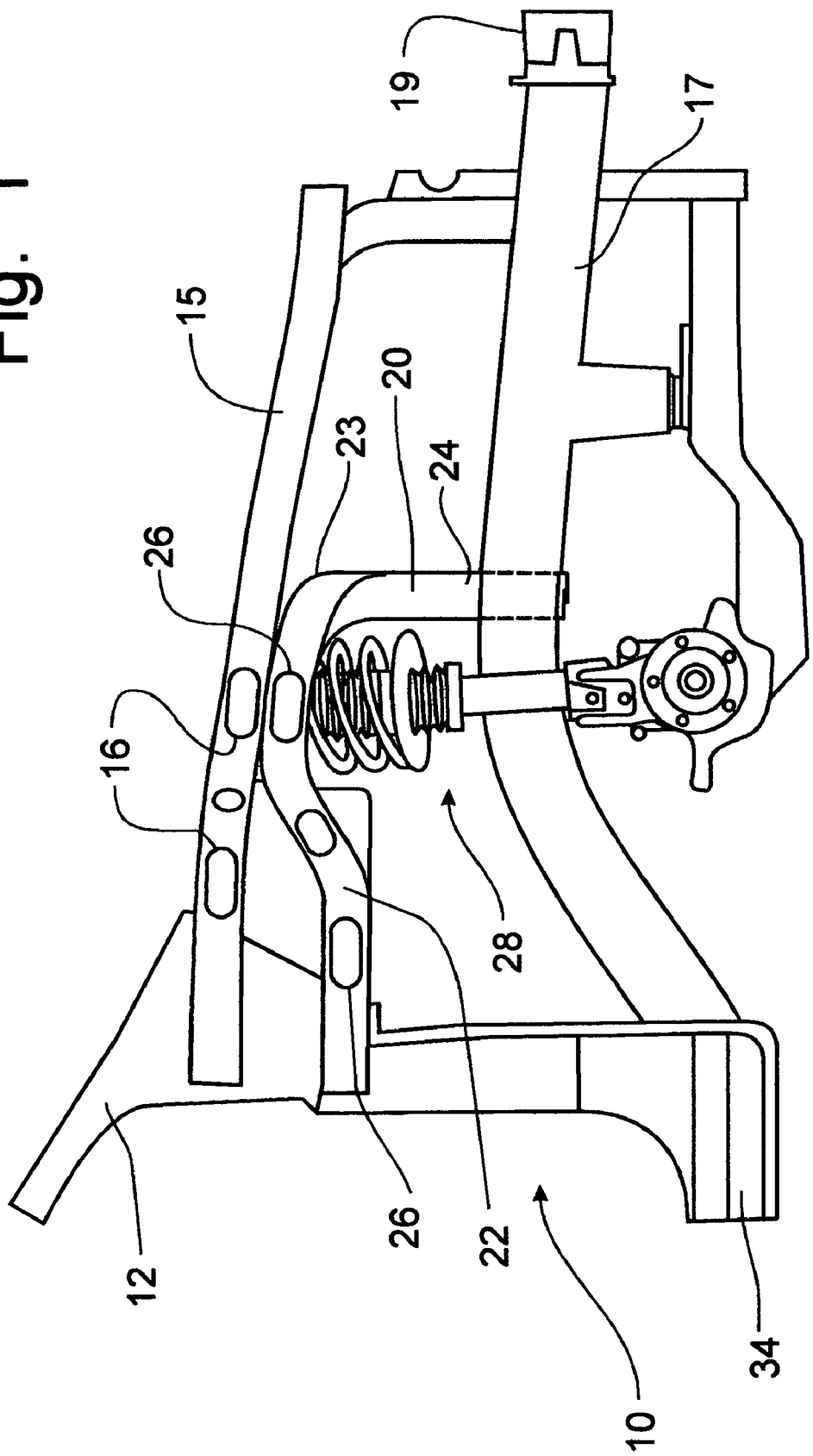
FIG. 1 is a side elevational view of a front end portion of an automotive frame incorporating the principles of the instant invention.

Referring to FIGS. 1-7, a joint forming a part of an automobile frame through a process incorporating the principles of the instant invention can best be seen. The automotive frame 10 is preferably formed from as many hydroformed tubular members as possible. Such tubular members can be spot-welded to form an integral frame assembly 10 for the front end of a vehicle.

Hydroforming is a process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members.

Spot-welding frame members that are oriented with portions positioned parallel to one another is accomplished by positioning the spot-welding electrodes through the access openings formed in the members to spot-weld adjacent surfaces together, as will be described in greater detail below. Openings in the frame members are often formed to permit the introduction of a spot-welding electrode into the interior cavity of a hydroformed frame member to permit the welding of another member having a side positioned against the opposing side of the frame member.

In the automotive frame 10 depicted in the drawings, the upper rail 15, which continues around the upper portion of the frame 10 in a U-shaped configuration, is formed from welded hydroformed members. Similarly, the lower rails 17, which project generally longitudinally to join with the front bumper support 19, are formed as a tubular hydroformed member. Likewise, the shock tower support member 20 is a hydroformed tubular member that has a curved shape that includes a generally longitudinally extending portion 22, a curved portion 23, and a generally vertical portion 24, and provides support for the shock tower 28.

The longitudinally extending portion 22 of the shock tower support member 20 is positioned immediately below the upper frame rail 15 so that the top of the shock tower support member 20 is welded to the bottom surface of the upper frame rail 15. To accomplish this welding process, both the upper frame rail 15 and the shock tower support member 20 are formed with access ports 16, 26 that become adjacent one another to permit the electrodes of the spot-welder to contact the appropriate adjacent surfaces of the frame members 15, 20. The insertion of multiple welds between the upper frame rail 15 and the longitudinal portion 22 of the shock tower support member 20 places these welds into a shear loading in crash situations where the forces urge one of the frame members 15, 20 to separate from the other member 15, 20.

The shock tower support member 20 then curves inwardly along said curved portion 23 and extends downwardly into engagement with the lower frame rail 17. Since the lower frame rail 17 is formed as a tubular member, an opening is formed in the top surface of the lower frame rail 17 and the vertical portion 24 of the shock tower support member 20 is inserted into the lower frame rail 17 until the end of the vertical portion 24 is aligned with the bottom surface of the lower frame rail 17. Spot-welding the vertical portion 24 of the shock tower support member 20 to the lower frame rail 17 along both the top surface of the lower frame rail 17 and the bottom surface of the lower frame rail 17 provides an integral frame connection between the shock tower support member 20 and the lower frame rail 17, thus providing a strong, durable and easily accessed joint. Alternatively, the vertical portion 24 can be joined to the lower frame rail 17 by MIG welding, preferably at the supplier level.

As best seen in FIG. 1, the longitudinal portion 22 of the shock tower support member 20 is bent to deflect downwardly from the upper frame rail 15 and intersect with the hinge pillar 12 at a location vertically spaced from the intersection of the upper frame rail 15 with the hinge pillar 12, thus providing a very stable and strong joint between the upper portion of the front frame 10 of the automobile and the remaining frame structure represented by the hinge pillar 12. The lower frame rail member 17 bends outwardly as the frame rail member 17 approaches the hinge pillar 12 for proper engagement with the hinge pillar 12 and the rocker beam 35, as will be described in greater detail below.

Figure 2:
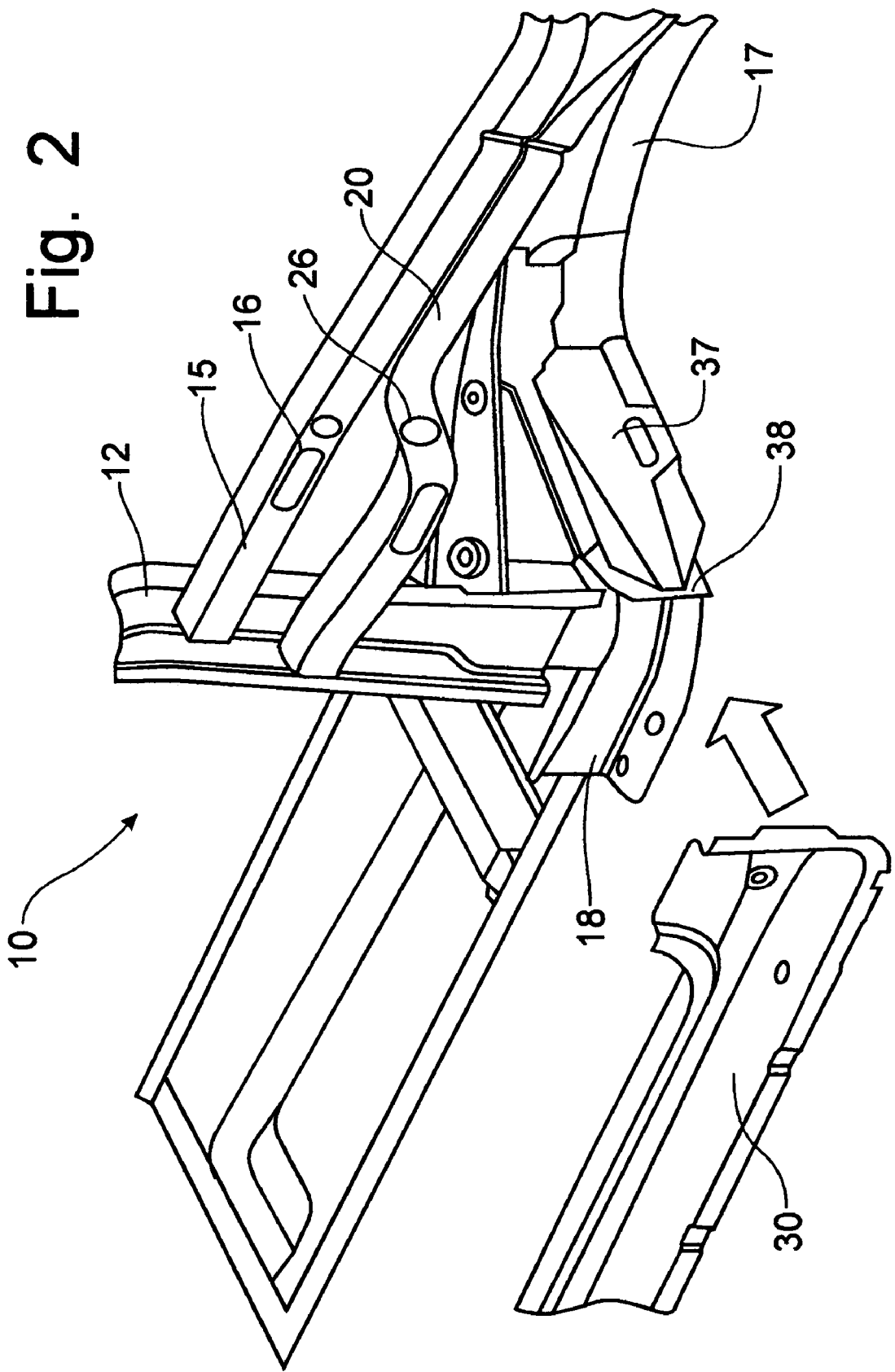
FIG. 2 is an enlarged exploded front perspective view of the joint formed between the front rail member and the rocker beam according to the principles of the instant invention.
Figure 3:
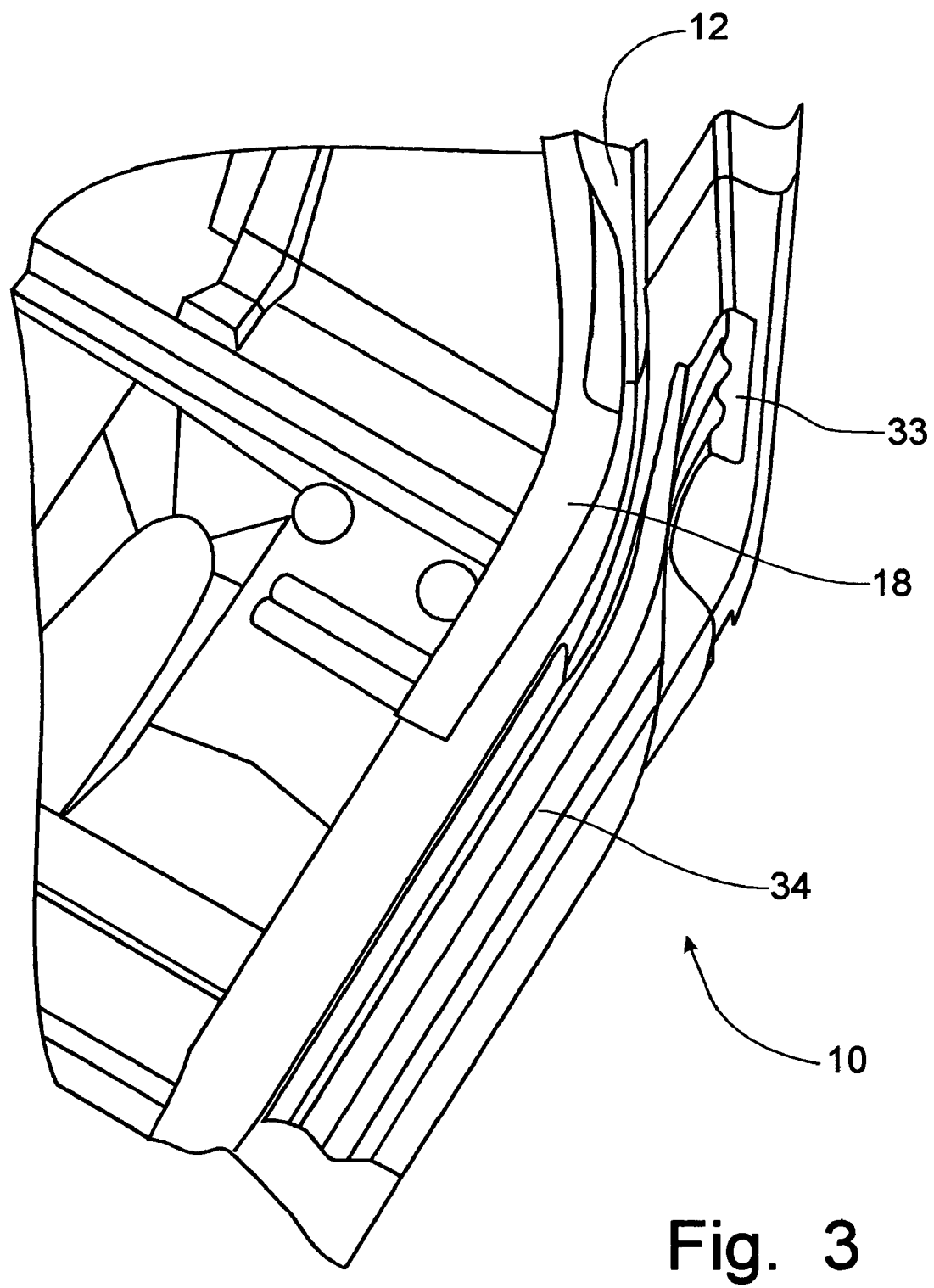
FIG. 3 is an enlarged upper, rear perspective view of the joint depicted in FIG. 2.
Figure 4:
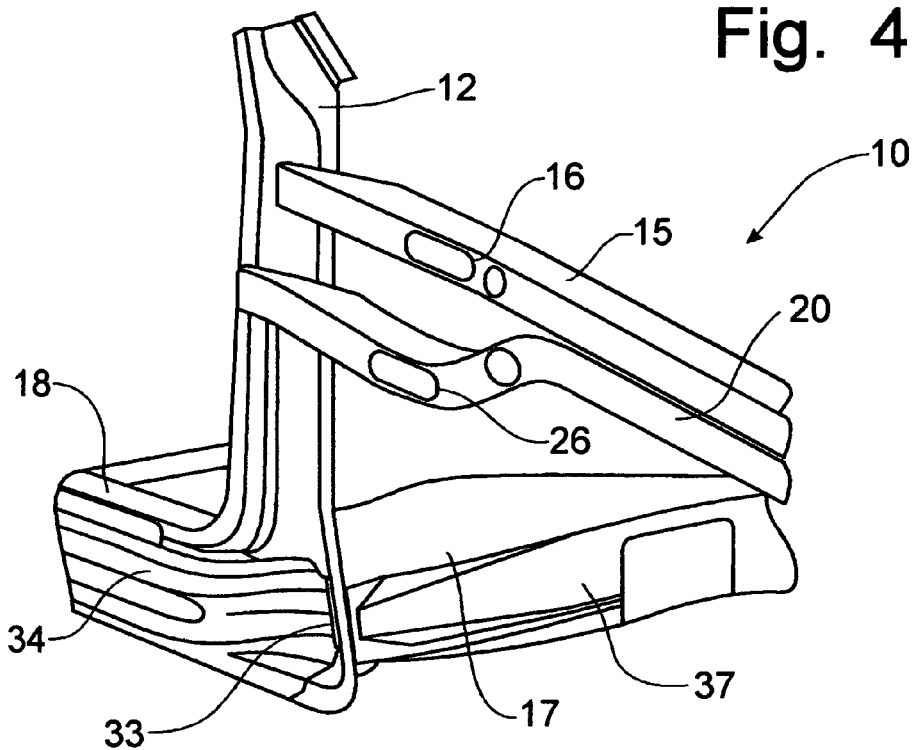
FIG. 4 is a front perspective view of the joint between the front rail member and the rocker beam shown in FIG. 3.
Figure 5:
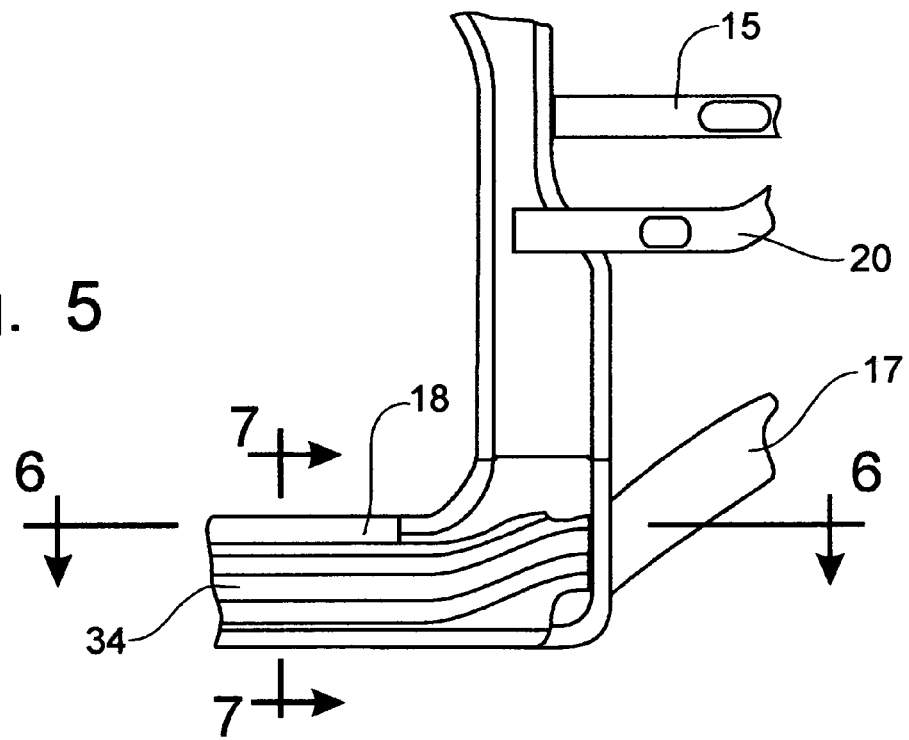
FIG. 5 is a side elevational view of the automotive frame joint depicted in FIGS. 3 and 4.

As can best be seen in FIG. 2, the rearward end 18 of the lower frame rail member 17 is formed as a C-shaped section with the concave surface thereof facing outwardly toward the rocker beam 35. The lower frame rail 17 is preferably formed through the hydroforming process as a conventional tubular member and then is subjected to a laser cutting process to remove the outside vertical face of the tubular member at the rearward end 18 which projects generally parallel to the body side inner member 30. The resulting shape of the lower frame rail 17 at the rearward end portion 18 is of a C-shaped section that has a vertical dimension that is slight greater than the outside vertical dimension of the body side inner member 30 so that the body side inner member 30 will nest into the C-shaped section of the rearward end 18. Welding between the rearward end 18 and the body side inner member 30 can be accomplished by either MIG-welding or, preferably, by spot-welding.

Referring now to FIGS. 2-7, one skilled in the art can see that the body side inner member 30 is formed to integrate into the hinge pillar 12 to form with the lower frame rail 17 a substantial joint for the frame 10. Preferably a body side reinforcement 32 is welded to the body side inner member 30 and a body side outer member 34 is welded to the flanges of the co-joined body side inner beam 30 and the body reinforcement member 32 to form the box section rocker beam 35, which is welded to the rearward end 18 of the lower frame rail 17 and the hinge pillar 12.

Preferably a rail reinforcement member 37 is mounted on the lower frame rail 17 forwardly of the hinge pillar 12 along the curved transition portion of the lower frame rail 17. Forming the rail reinforcement member 37 with a flange 38 to butt against the corresponding flange 31 of the body side inner member 30, which when joined with the flange 33 of the body side outer member 34, and welded together, provides a very stiff joint, as the rail reinforcement member 37 is swept off the lower frame rail 17 to provide a box section. This three-flange welded joint between the rail reinforcement member 37, the body side inner member 30 and the body side outer member 34, can best be seen in the horizontal cross-sectional view of FIG. 6.

The joint between the lower frame rail member 17 and the rocker beam 35 is preferably formed by first cutting and removing the outside vertical face from the rearward end 18 of the lower frame rail 17 to form the rearward end 18 as a C-shaped section. The three-sided body side inner member 30 can be moved generally horizontally into engagement with the rearward end C-shaped section 18, so as to be nested within the C-shaped section, where the body side inner member 30 can be welded to the rearward end 18 of the lower frame rail 17. The rail reinforcement member 32 can then be welded to the three-sided body side inner member 30 to form a box section. The body side outer member 34 can then be welded to the body reinforcement member 32 to complete the formation of the rocker beam 35 welded to the lower frame rail 17.

The use of the hydroformed tubular members 15, 17, 20, provides significant cost savings in the manufacturing of an automotive frame assembly 10 if the hydroformed tubular members can be amicably mated to the remaining existing structures of the frame 10. The formation of the rocker beam 35 to the lower front frame rail 17 is also applicable to the joint required for the rear frame rail (not shown) and the rocker beam 35. Furthermore, the improvement of the rocker beam 35 to hinge pillar 12 joint by integrating the rail reinforcement member 37, the hinge pillar 12, the body side inner member 30 and the body side outer member 34, provides a structural improvement of conventional frame assembly formation through innovative use of existing structure mated into hydroformed frame members.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive frame having a frame rail, a rocker beam and a hinge pillar which are to be welded together in the formation of said automotive frame, the improvement comprising:
    said frame rail is formed with a C-shaped section along a portion thereof oriented generally parallel to said rocker beam, said C-shaped section having a concave face facing said rocker beam so as to receive said rocker beam in a nesting relationship with said C-shaped section and a rail reinforcement member positioned forwardly of said hinge pillar and being welded to said rocker beam and to said frame rail.

2. The automotive frame of claim 1 wherein said rocker beam comprises a body side inner member nested with said C-shaped section of said frame rail, said body side inner member having a vertically extending flange located for positioning against a corresponding vertically extending flange of said rail reinforcement member, said flange of said body side inner member being welded to said flange of said rail reinforcement member.

3. The automotive frame of claim 2 wherein said rocker beam further comprises a body side outer member affixed to said body side inner member and said rail reinforcement member, said body side outer member having a vertically extending flange positionable into engagement with said vertically extending flanges of said body side inner member and said rail reinforcement member.

4. The automotive frame of claim 3 wherein said body side inner member is also welded to said hinge pillar.

5. The automotive frame of claim 3 wherein said frame rail is formed as a tubular member through a hydroforming process, an outer vertical face of said tubular member at said portion thereof adjacent to and oriented generally parallel to said rocker beam being removed to form said C-shaped section.

6. The automotive frame of claim 3 wherein said frame rail is a lower front frame rail of said automotive frame, said lower front frame rail extending forwardly from said rocker beam and extending forwardly beyond said hinge pillar.

7. An automotive frame joint comprising:
    a first tubular frame member having a longitudinally extending portion formed as a C-shaped section defining a concave face thereof;
    a second frame member having a shape conforming to said C-shaped section to permit said second frame member to nest within and engage said C-shaped section, said first frame member being welded to said second frame member in said nested relationship; and
    a rail reinforcement member welded to said second frame member and to said first frame member.

8. The automotive frame joint of claim 7 wherein said first frame member is formed as a tubular member through a hydroforming process, an outer vertical face of said first frame member at said longitudinally extending portion being removed to form said C-shaped section.

9. The automotive frame joint of claim 8 wherein said first frame member is a lower frame rail and said second frame member is a rocker beam.

10. The automotive frame joint of claim 9 wherein said rocker beam comprises:
    a three-sided body side inner member received within said C-shaped section of said lower frame rail;
    a body side reinforcement welded to said body side inner member; and
    a body side outer member welded to said body side reinforcement to form a box section with said body side reinforcement being positioned internally of said box section.

11. The automotive frame joint of claim 10 wherein said body side inner member has a vertically extending flange positioned against a corresponding vertically extending flange of said rail reinforcement member, said flange of said body side inner member being welded to said flange of said rail reinforcement member, said body side outer member also having a vertically extending flange positionable into engagement with said vertically extending flanges of said body side inner member and said rail reinforcement member.

12. A method of forming an automotive frame joint comprising the steps of:
    hydroforming a lower frame rail as a tubular member through a hydroforming process, said lower frame rail having an end portion oriented generally longitudinally, said end portion having first and second opposing vertical faces;
    cutting and removing a portion of said first vertical face of said lower frame rail along said end portion to form said end portion as a C-shaped section;
    providing a rocker beam extending generally longitudinally adjacent said end portion of said lower frame rail, said rocker beam having a size and shape to permit the reception thereof in a nesting relationship within said C-shaped section;
    welding said rocker beam to said end portion of said lower frame rail in said nesting relationship;
    providing a rail reinforcement member; and
    attaching said rail reinforcement member to said rocker beam and to said lower frame rail.

13. The method of claim 12 wherein said step of welding said rocker beam to said end portion of said lower frame rail includes the steps of:
    welding a body side inner member to said C-shaped section of said end portion of said lower frame rail with said body side inner member being nested within said C-shaped section;
    welding a body side reinforcement to said body side inner member; and
    welding a body side outer member to said body side inner member to form a box section rocker beam welded to said end portion of said lower frame rail.

14. The method of claim 13 wherein said attaching step comprises the steps of:
    welding a vertically extending flange of said rail reinforcement member to a corresponding generally vertically extending flange of said body side inner member.

15. The method of claim 14 wherein said attaching step further comprises the step of:
  welding a vertically extending flange of said body side outer member to said flanges of said body side inner member and said rail reinforcement member.

16. The method of claim 15 further comprising the step of:
  welding said body side inner member to a vertically oriented hinge pillar.

* * * * *